United States Patent
Boukricha et al.

(10) Patent No.: US 11,178,162 B2
(45) Date of Patent: Nov. 16, 2021

(54) METHOD AND DEVICE FOR DETECTING ANOMALIES IN A COMPUTER NETWORK

(71) Applicant: Robert Bosch GmbH, Stuttgart (DE)

(72) Inventors: Hana Boukricha, Muehlacker (DE);
Janin Wolfinger, Stuttgart (DE);
Michael Herrmann, Düsseldorf (DE);
Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 16/453,370

(22) Filed: Jun. 26, 2019

(65) Prior Publication Data
US 2020/0036738 A1 Jan. 30, 2020

(30) Foreign Application Priority Data
Jul. 30, 2018 (DE) .................... 10 2018 212 657.7

(51) Int. Cl.
*H04L 29/06* (2006.01)
(52) U.S. Cl.
CPC ...... *H04L 63/1425* (2013.01); *H04L 63/1416* (2013.01); *H04L 63/20* (2013.01)
(58) Field of Classification Search
CPC .. H04L 63/20; H04L 63/1416; H04L 63/1425
USPC ............................................. 726/1
See application file for complete search history.

(56) References Cited

U.S. PATENT DOCUMENTS

| | | | |
|---|---|---|---|
| 2016/0188396 A1* | 6/2016 | Sonalker | H04L 63/1425 714/37 |
| 2016/0261482 A1* | 9/2016 | Mixer | H04L 43/04 |
| 2018/0124076 A1* | 5/2018 | Zibuschka | H04L 63/0227 |
| 2018/0314571 A1* | 11/2018 | Tanabe | H04L 41/0681 |
| 2020/0053567 A1* | 2/2020 | Monshizadeh | H04W 4/70 |
| 2020/0412756 A1* | 12/2020 | Kishikawa | B60R 16/02 |

FOREIGN PATENT DOCUMENTS

DE 102016221378 A1 5/2018

* cited by examiner

*Primary Examiner* — Benjamin A Kaplan
(74) *Attorney, Agent, or Firm* — Norton Rose Fulbright US LLP; Gerard Messina

(57) ABSTRACT

A method for detecting anomalies in a computer network, in which a message transmitted over the computer network is received or recorded by a node of the computer network; based on at least the message, it is checked by a detection mechanism of the node whether the anomalies have occurred, and an occurrence of the anomalies is either confirmed or refuted according to a predefined detection rule of the detection mechanism.

20 Claims, 4 Drawing Sheets

METHOD AND DEVICE FOR DETECTING ANOMALIES IN A COMPUTER NETWORK

CROSS REFERENCE

The present application claims the benefit under 35 U.S.C. § 119 of German Patent Application No. DE 102018212657.7 filed on Jul. 30, 2018, which is expressly incorporated herein by reference in its entirety.

FIELD

The present invention relates to a method for detecting anomalies in a computer network. The present invention also relates to a corresponding device, a corresponding computer program, as well as a corresponding memory medium.

BACKGROUND INFORMATION

Any system for detecting intrusions that are directed to a computer system or a computer network is referred to in IT security as an intrusion detection system (IDS). Conventional IDSs often employ a combination of a state-oriented packet check, pattern matching and the detection of anomalies.

German Patent Application No. DE 102016221378 A1 relates to a method for protecting a device against information technology intrusions, in which data received by at least one device is checked for an information technology intrusion by an intrusion detection system encompassed by the device, and in the event the received data are assigned to an information technology intrusion, characteristic data about the information technology intrusion are saved in the device and are transmitted via a communication interface to a unit which communicates with a multitude of devices, and in which the unit evaluates the characteristic data transmitted by the device and outputs as a function of at least one predefined criterion an alert message to at least a portion of the devices that communicate with the unit.

SUMMARY

The present invention provides a method for detecting anomalies in a computer network, a corresponding device, a corresponding computer program, as well as a corresponding memory medium.

The approach presented below is based on the recognition that existing intrusion detection systems for automobiles are generally based on a centralized approach. The IDS component is typically provided on a central gateway and monitors the network traffic passing this gateway. One disadvantage of such IDS systems is that the pieces of information they are able to consider are limited to the network messages and their content. For example, the internal state of an electronic control unit (ECU), which is connected to the corresponding field bus or network, is unknown to the central IDS.

According to the present invention, a distributed IDS is able to detect more anomalies than a centralized IDS.

One advantage of the approach according to the present invention is an improved IDS detection rate and thus improved effectiveness of the anomaly detection. It, thus, introduces scenarios and suitable mechanisms for a distributed anomaly detection, which enable anomalies to be detected, which existing approaches, for example, a typical centralized IDS, are unable to detect or able to detect only with a low probability.

Advantageous refinements of and improvements on the basic embodiment of the present invention are possible with the measures described herein. Thus, it may be provided to have messages transmitted over the computer network to be recorded or received by individual terminals. A traditional central IDS has no knowledge of internal states of these individual nodes, for example, of individual ECUs, which are connected to a vehicle-internal network. Moreover, due to field bus specifications, a central IDS has no simple option for determining the actual source of a message. Consequently, anomalies that may be detected using the provided mechanisms are, in principle, impossible to detect, or else at least only possible to detect with significant labor and cost using a central IDS. In other words, the detection mechanisms described below may allow anomalies to be detected, which are impossible to detect or may be detected only with great difficulty and cost using existing approaches according to the related art.

BRIEF DESCRIPTION OF THE DRAWINGS

Exemplary embodiments of the present invention are shown in the drawings and explained in greater detail below.

DETAILED DESCRIPTION OF EXAMPLE EMBODIMENTS

Figure 1:
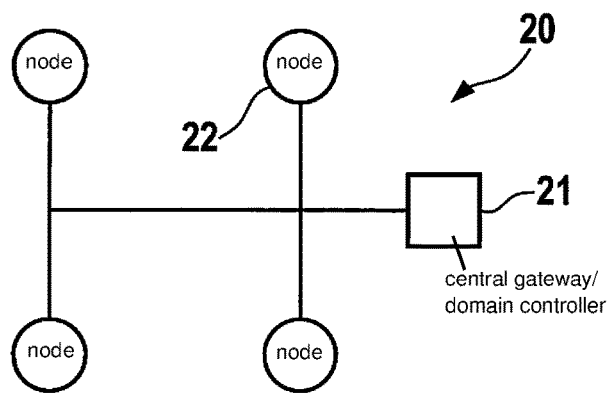
FIG. 1 shows an abstract model of a vehicle-internal field bus.

FIG. 1 illustrates an abstract model of a typical vehicle-internal field bus 20. Circles 22 denote nodes $i \in I$, which are connected to bus 20, for example, ECUs. These components 20 may receive, process, and transmit messages. Square-shaped node 21 depicted denotes a gateway or a domain controller, which is connected to other sub-networks of the vehicle and possibly includes external interfaces such as ODB-II or Bluetooth.

In conventional, distributed electrical-electronic (E/E) architectures, square-shaped node 21 typically acts like a switching device (switch), which enables the communication between ECUs on various buses. For newer domain-wide central architectures, square-shaped node 21 depicted would denote a domain controller, which could fulfill tasks going beyond the communication of incoming messages and, in particular, could actively participate in the communication within field bus 20. As a rule, a centralized IDS would be carried out on this gateway or domain controller 21.

In contrast, the intrusion detection in an IDS according to a specific embodiment of the present invention is distributed to multiple nodes 22. In one field bus 20, all of these nodes 22 share a physical connection. Therefore, each node 22 sees all messages $M_j$ transmitted over bus j. If $T_i$ further denotes the messages sent by node i and $S_i$ its internal state, then the IDS provided therefore has the information $M_j \times T_i \times S_i$, whereas only the respectively recorded message $M_j$ would be known to a central IDS.

As indicated by these explanations, a distributed IDS has more pieces of information for its decision-making than a centralized IDS. The messages $T_i$ that have been sent by corresponding node i, the sequence of its previous states, as well as the instantaneous state of i are, in particular, known only to i itself and are therefore available only in a distributed IDS. One finding based on the approach described below is that the information embodied by $T_i$ and $S_i$ improves the effectiveness of the anomaly detection and should therefore be utilized by the IDS.

Following is a detailed description of the provided mechanisms. Each description is made up of four parts: of the descriptions of the normal operation, of the anomalies, of the detection mechanism and of its specific advantage for the respective scenario. The first part describes the system behavior in the absence of anomalies. The second part furnishes a detailed description of the anomaly detectable in this way. The third part describes how the aforementioned anomaly may be detected and discusses the type of pieces of information that must be assessed in order to detect this anomaly. Finally, the fourth and last part compares the detection mechanism provided with the detection capabilities of a typical centralized IDS and aims to compare both approaches and to identify advantages, which particularly distinguish the provided mechanisms.

A first mechanism is based on the observation that certain messages r,r', . . . are never received by a node i during normal operation, while this node is in certain states s,s', . . . . Node i could, for example, have states that reflect local pieces of information. This means, $S_i$ could encompass states that may not be derived from the messages transmitted over bus 20, from the states of the central gateway or domain controller 21 or from other nodes 22, for example, from other ECUs. In these states, however, it would be implausible to receive one or multiple messages r,r' . . . .

It would therefore be seen as an anomaly if one or multiple messages r,r', . . . are received while node i is in one of states s,s', . . . .

Figure 2:
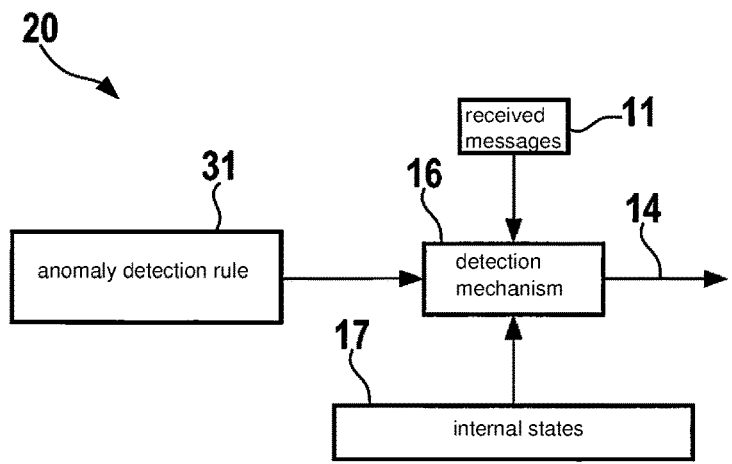
FIG. 2 shows a detection mechanism for a first anomaly.
Figure 3:
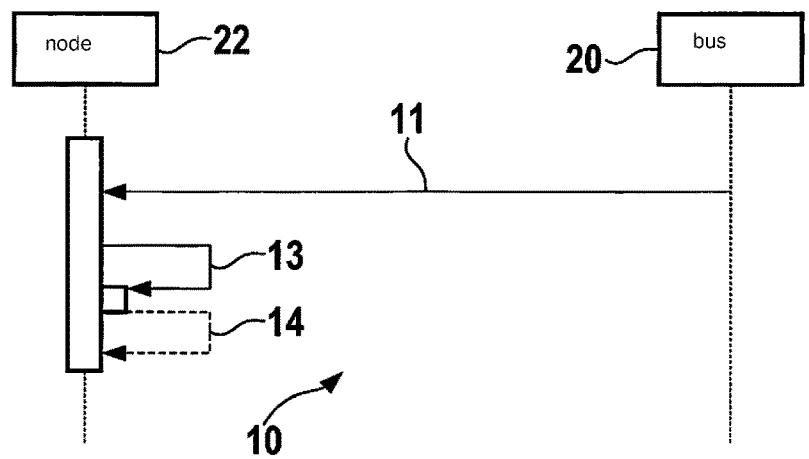
FIG. 3 shows a detection process for the first anomaly.

The corresponding detection mechanism is shown in FIG. 2. Mechanism 16 implements an anomaly detection rule 31, which specifies that certain combinations r,s, r',s', . . . are not allowed, and monitors messages $R_i$, which are received 11 by node i, as well as the internal state $s \in S_i$ of i 17. Process 10 of anomaly detection is depicted in FIG. 3.

A second mechanism is based on the finding that some messages m may be transmitted by multiple authorized senders 21, 22, for example, multiple ECUs. However, since these various senders m send in various states of overall system 20, the response to m in an individual case is a function of who the respective sender was. Consider for example two nodes i and i', for example, ECUs, both of which are legitimate senders of a diagnostic message m. While node i sends m only when the vehicle is moving, node i' sends m only when the vehicle is not moving. It is further assumed that when sending m, another node 22 responds with a message r, which contains, among other things, the speed of the vehicle.

Thus, an anomaly would be present if after message m is sent, legitimate sender 22 records an answer r in such a way that one or more properties of r, for example, the value of a specific CAN signal, would not correspond to the value range expected for the normal operation.

Figure 4:
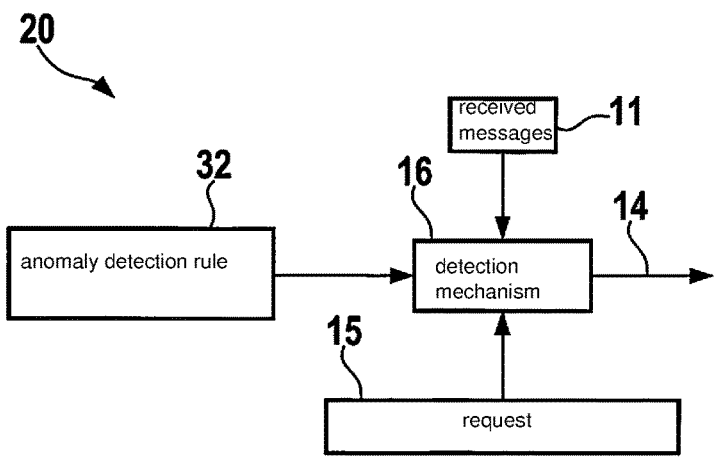
FIG. 4 shows a detection mechanism for a second anomaly.
Figure 5:
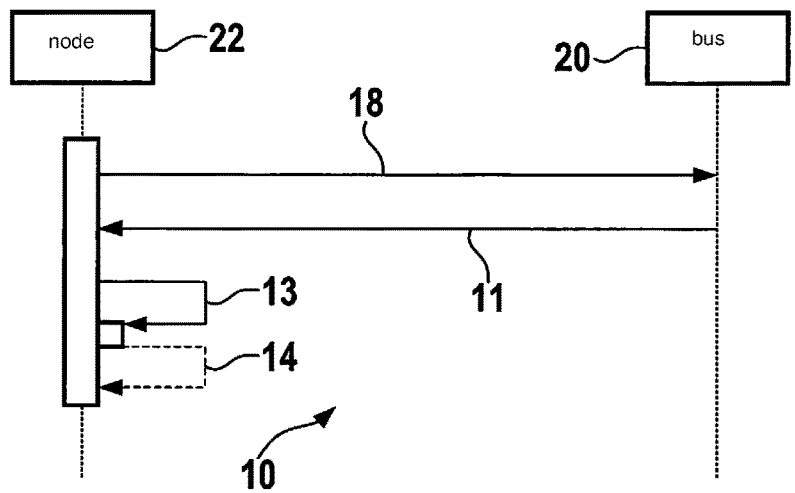
FIG. 5 shows a detection process for the second anomaly.

The corresponding detection mechanism is shown in FIG. 4. Mechanism 16 implements an anomaly detection rule 32, which states that whenever i transmits m 15 and receives r as a response 11, r must meet certain criteria. The process 10 of the anomaly detection is depicted in FIG. 5.

A third mechanism follows from the observation that one or multiple messages m,m', . . . are never sent as i by another node 22, as long as i is in one of provided states $s,s', \ldots \in S_i$. As an example, it is assumed that there are two nodes i,i', for example, ECUs, both of which are authorized to send a message m. However, while node i is in state s, it is the only legitimate sender. This means a global vehicle state implies that if i is in state s, other node i' will never send message m under normal operating conditions.

Thus, it would constitute an anomaly if node i records a particular message m, while i is in state s. This would be an anomaly insofar as according to the preceding definition no other node (for example, no other ECU) beside i may send message m while i is in state s.

Figure 6:
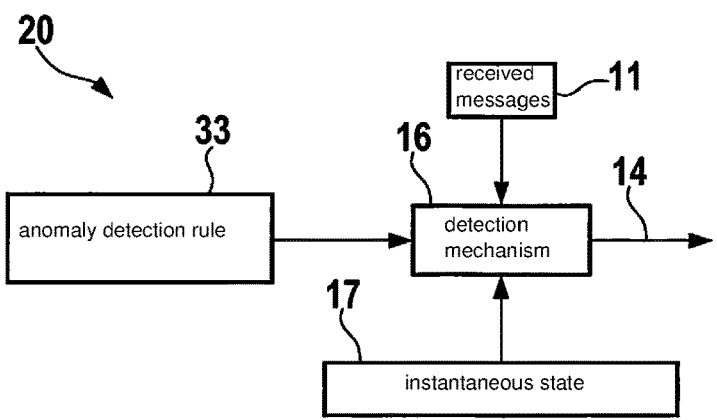
FIG. 6 shows a detection mechanism for a third anomaly.
Figure 7:
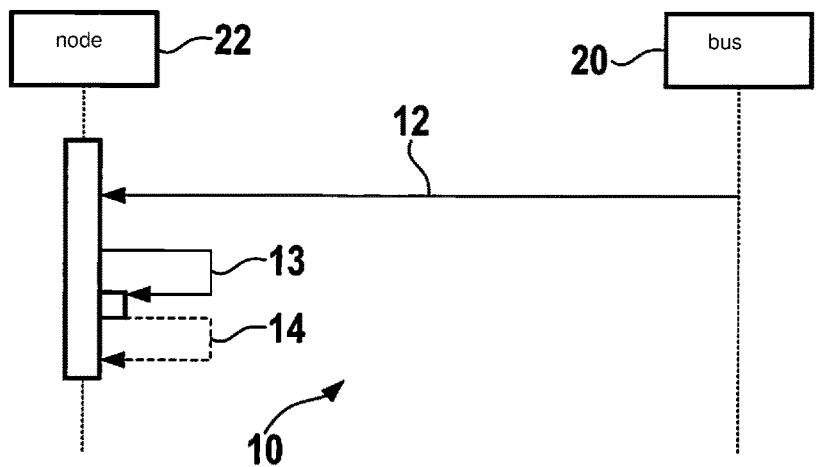
FIG. 7 shows a detection process for the third anomaly.

The corresponding detection mechanism is shown in FIG. 6. Mechanism 16 implements a detection rule 33, which specifies that it constitutes an anomaly if node 22 records 12 message m sent over bus 20 while i itself did not send the message and its instantaneous state is s 17. Process 10 of the anomaly detection is depicted in FIG. 7.

A fourth mechanism is based on the recognition that certain messages m, m', . . . are recorded only on bus 20 or may be received by i only if node i sends a message $t_i$, while it is in state s. It is assumed, for example, that there is a message m, which is sent by a node 22, for example, by an ECU. If m is transmitted as a response to message $t_i$ of node i or for other reasons after this, while i is in a certain state s, it is expected that message m includes one or multiple unambiguous properties. For example, it is expected that the value(s) of one or of multiple signal(s) transmitted by m is/are within a certain range.

This would be considered an anomaly if node i, after sending a message t in state s, were to receive or record a message m, which violates one or multiple of the described property/properties.

Figure 8:
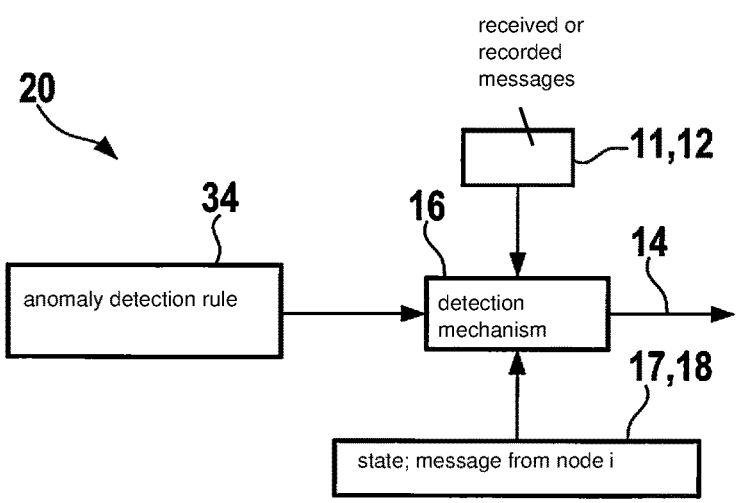
FIG. 8 shows a detection mechanism for a fourth anomaly.
Figure 9:
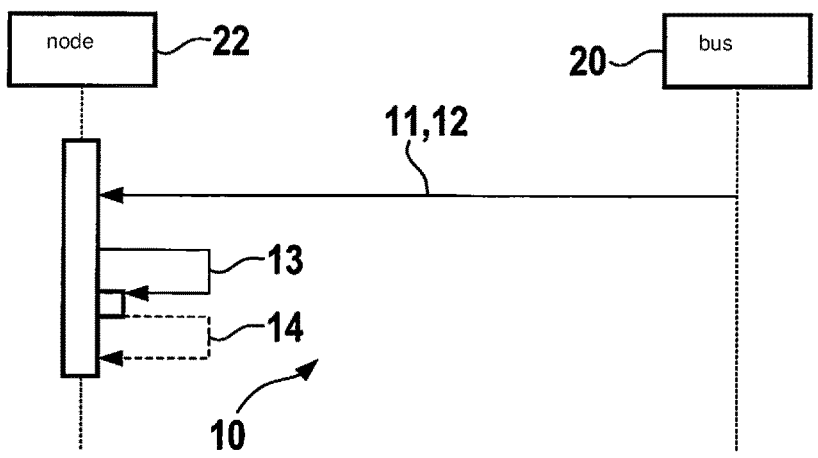
FIG. 9 shows a detection process for the fourth anomaly.

The corresponding detection mechanism is shown in FIG. 8. Mechanism 16 implements an anomaly detection rule 34, which states that if node i has sent 18 a message $t_i$, while it was 17 in state s, and has received or recorded a message 11, 12, which violates one or multiple expected property/properties, this is to be considered an anomaly. Process 10 of this anomaly detection is depicted in FIG. 9.

Finally, a fifth mechanism is based on the assumption that certain messages m,m' . . . are never observed on bus 20 while node i is in certain states $s,s', \ldots \in S_i$. If, for example, the state of node i implies that the vehicle is not moving, the recording of messages that change the driving dynamic cannot be assumed.

Against this background, an anomaly could only be expressed by the fact that one or multiple message(s) m,m', . . . is/are recorded by node i while this node is in one of states $s,s', \ldots \in S_i$.

Figure 10:
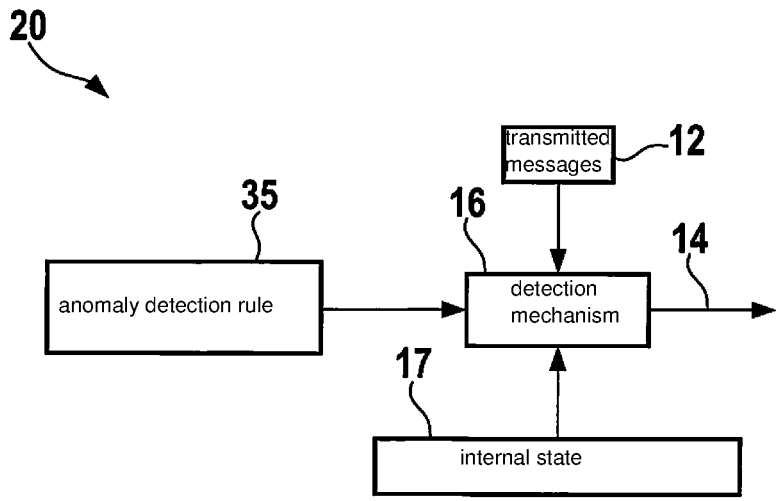
FIG. 10 shows a detection mechanism for a fifth anomaly.
Figure 11:
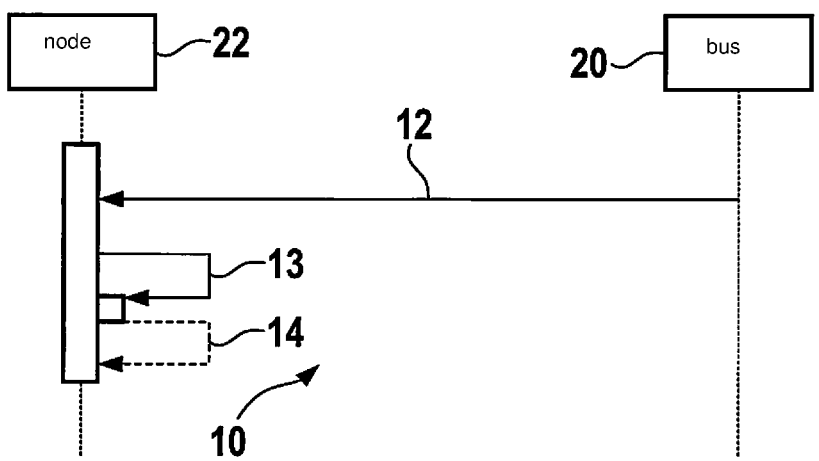
FIG. 11 shows a detection process for the fifth anomaly.

The corresponding detection mechanism is shown in FIG. 10. Mechanism 16 implements an anomaly detection rule 35, which specifies that certain combinations m,s, m's', . . . are not allowed, and monitors messages $m \in M_j$, which are transmitted 12 over bus j, as well as internal state $s \in S_i$ of i, 17. Process 10 of this anomaly detection is shown in FIG. 11.

In one possible extension of method 10, those mechanisms 16 explained above, which take pieces of state information $s \in S_i$ into consideration 17, are improved to the extent that multiple successive states are taken into consideration. Within the scope of the following explanations, $S_i^t$ denotes the state of node i at the point in time t (for example, in the corresponding clock cycle), at which the anomaly occurs. Above described mechanisms 16, in accordance with this definition, take only this state $S_i^t$ into consideration. In order to further improve the anomaly detection rate and to possibly reduce the false-positive rate, it is conceivable to take k previous states $S_i^{t-k}, S_i^{t-k+1}, \ldots, S_i^{t-1}$ into consideration. The consideration of these earlier states requires more memory for intrusion detection, but it also increases the detection efficiency.

This method 10 may, for example, be implemented in software or in hardware or in a mixed form of software and hardware, for example, in a control unit 22.

What is claimed is:

1. A method for detecting anomalies in a computer network, comprising:
   receiving or recording, by a node of the computer network, a message transmitted over the computer network;
   based at least on the message, checking, by a detection mechanism of the node, whether an anomaly has occurred; and
   confirming or refuting an occurrence of the anomaly according to a predefined detection rule of the detection mechanism;
   wherein:
   (i) the message is received by the node in response to a request by the node, the predefined detection rule defines an expected response to the request by the node, and the confirming or refuting is performed by comparing (a) the message received in the response to the request by the node to (b) the expected response;
   (ii) the message is received or recorded by the node after the node had previously sent an earlier message in a predefined state, the predefined detection rule defines an expected value of the received or recorded message for the predefined state of the sending of the earlier message, and the confirming or refuting is performed based on (1) a determination of the node being in the predefined state when the earlier message was sent and (2) a comparison of (a) a value of the received or recorded message to (b) the expected value;
   (iii) the message is received or recorded by the node while the node is in the predefined state, the predefined detection rule defines an expected value of the received or recorded message whenever received or recorded while the node is in the predefined state, and the confirming or refuting is performed based on (1) a determination of the node being in the predefined state when the message is received or recorded and (2) a comparison of (a) a value of the received or recorded message to (b) the expected value; or
   (iv) the method includes the confirming of the occurrence of the anomaly, the predefined detection rule defines that the node does not receive or record the message whenever the node is in a predefined node state, and the occurrence is confirmed in response to determining that, in contravention to the predefined rule, the message has been received or recorded while the node was in the predefined node state.

2. The method as recited in claim 1, wherein the computer network includes a switching device and terminals, and the node is one of the terminals.

3. The method as recited in claim 1, wherein the message is received by the node in response to the request by the node, the predefined detection rule defines the expected response to the request by the node, and the confirming or refuting is performed by comparing (a) the message received in the response to the request by the node to (b) the expected response.

4. The method as recited in claim 1, wherein the message is received by the node after the node had previously sent the earlier message in the predefined state of the sending of the earlier message, the predefined detection rule defines the expected value of the received message for the predefined state of the sending of the earlier message, and the confirming or refuting is performed based on (1) the determination of the node being in the predefined state when the earlier message was sent and (2) the comparison of (a) the value of the received message to (b) the expected value.

5. The method as recited in claim 1, wherein the message is recorded by the node after the node had previously sent an earlier message in the predefined state of the sending of the earlier message, the predefined detection rule defines the expected value of the recorded message for the predefined state of the sending of the earlier message, and the confirming or refuting is performed based on (1) the determination of the node being in the predefined state when the earlier message was sent and (2) the comparison of (a) the value of the recorded message to (b) the expected value.

6. The method as recited in claim 1, wherein the message is received by the node while the node is in the predefined state, the predefined detection rule defines the expected value of the received message whenever received while the node is in the predefined state, and the confirming or refuting is performed based on (1) the determination of the node being in the predefined state when the message is received and (2) the comparison of (a) the value of the received message to (b) the expected value.

7. The method as recited in claim 1, wherein the message is recorded by the node while the node is in the predefined state, the predefined detection rule defines the expected value of the recorded message whenever recorded while the node is in the predefined state, and the confirming or refuting is performed based on (1) the determination of the node being in the predefined state when the message is recorded and (2) the comparison of (a) the value of the recorded message to (b) the expected value.

8. The method as recited in claim 1, wherein the method includes the confirming of the occurrence of the anomaly, the predefined detection rule defines that the node does not receive the message whenever the node is in the predefined node state, and the occurrence is confirmed in response to determining that, in contravention to the predefined rule, the message has been received while the node was in the predefined node state.

9. The method as recited in claim 1, wherein the method includes the confirming of the occurrence of the anomaly, the predefined detection rule defines that the node does not record the message whenever the node is in the predefined node state, and the occurrence is confirmed in response to determining that, in contravention to the predefined rule, the message has been recorded while the node was in the predefined node state.

10. A non-transitory machine-readable memory medium on which is stored a computer program for detecting anomalies in a computer network, the computer program, when executed on a computer, causing the computer to perform a method, the method comprising:
    receiving or recording, by a node of the computer network, a message transmitted over the computer network;

based at least on the message, checking, by a detection mechanism of the node, whether an anomaly has occurred; and confirming or refuting an occurrence of the anomaly according to a predefined detection rule of the detection mechanism;

wherein:
(i) the message is received by the node in response to a request by the node, the predefined detection rule defines an expected response to the request by the node, and the confirming or refuting is performed by comparing (a) the message received in the response to the request by the node to (b) the expected response;
(ii) the message is received or recorded by the node after the node had previously sent an earlier message in a predefined state, the predefined detection rule defines an expected value of the received or recorded message for the predefined state of the sending of the earlier message, and the confirming or refuting is performed based on (1) a determination of the node being in the predefined state when the earlier message was sent and (2) a comparison of (a) a value of the received or recorded message to (b) the expected value;
(iii) the message is received or recorded by the node while the node is in the predefined state, the predefined detection rule defines an expected value of the received or recorded message whenever received or recorded while the node is in the predefined state, and the confirming or refuting is performed based on (1) a determination of the node being in the predefined state when the message is received or recorded and (2) a comparison of (a) a value of the received or recorded message to (b) the expected value; or
(iv) the method includes the confirming of the occurrence of the anomaly, the predefined detection rule defines that the node does not receive or record the message whenever the node is in a predefined node state, and the occurrence is confirmed in response to determining that, in contravention to the predefined rule, the message has been received or recorded while the node was in the predefined node state.

11. The non-transitory machine-readable memory as recited in claim 10, wherein the message is received by the node in response to the request by the node, the predefined detection rule defines the expected response to the request by the node, and the confirming or refuting is performed by comparing (a) the message received in the response to the request by the node to (b) the expected response.

12. The non-transitory machine-readable memory as recited in claim 10, wherein the message is received or recorded by the node after the node had previously sent the earlier message in the predefined state, the predefined detection rule defines the expected value of the received or recorded message for the predefined state of the sending of the earlier message, and the confirming or refuting is performed based on (1) the determination of the node being in the predefined state when the earlier message was sent and (2) a comparison of (a) the value of the received or recorded message to (b) the expected value.

13. The non-transitory machine-readable memory as recited in claim 10, wherein the message is received or recorded by the node while the node is in the predefined state, the predefined detection rule defines the expected value of the received or recorded message whenever received or recorded while the node is in the predefined state, and the confirming or refuting is performed based on (1) the determination of the node being in the predefined state when the message is received or recorded and (2) the comparison of (a) the value of the received or recorded message to (b) the expected value.

14. The non-transitory machine-readable memory as recited in claim 10, wherein the method includes the confirming of the occurrence of the anomaly, the predefined detection rule defines that the node does not receive or record the message whenever the node is in the predefined node state, and the occurrence is confirmed in response to determining that, in contravention to the predefined rule, the message has been received or recorded while the node was in the predefined node state.

15. A device configured to detect anomalies in a computer network, the device configured to:

receive or record, by a node of the computer network, a message transmitted over the computer network;

based at least on the message, check, by a detection mechanism of the node, whether an anomaly has occurred; and confirm or refute an occurrence of the anomaly according to a predefined detection rule of the detection mechanism;

wherein:
(i) the message is received by the node in response to a request by the node, the predefined detection rule defines an expected response to the request by the node, and the confirmation or refutation is performed by comparing (a) the message received in the response to the request by the node to (b) the expected response;
(ii) the message is received or recorded by the node after the node had previously sent an earlier message in a predefined state, the predefined detection rule defines an expected value of the received or recorded message for the predefined state of the sending of the earlier message, and the confirmation or refutation is performed based on (1) a determination of the node being in the predefined state when the earlier message was sent and (2) a comparison of (a) a value of the received or recorded message to (b) the expected value;
(iii) the message is received or recorded by the node while the node is in the predefined state, the predefined detection rule defines an expected value of the received or recorded message whenever received or recorded while the node is in the predefined state, and the confirmation or refutation is performed based on (1) a determination of the node being in the predefined state when the message is received or recorded and (2) a comparison of (a) a value of the received or recorded message to (b) the expected value; or
(iv) the device is configured to perform the confirmation of the occurrence of the anomaly, the predefined detection rule defines that the node does not receive or record the message whenever the node is in a predefined node state, and the occurrence is confirmed in response to determining that, in contravention to the predefined rule, the message has been received or recorded while the node was in the predefined node state.

16. The device as recited in claim 15, wherein the message is received by the node in response to the request by the node, the predefined detection rule defines the expected response to the request by the node, and the confirmation or refutation is performed by comparing (a) the message received in the response to the request by the node to (b) the expected response.

17. The device as recited in claim 15, wherein the message is received or recorded by the node after the node had previously sent the earlier message in the predefined state, the predefined detection rule defines the expected value of the received or recorded message for the predefined state of the sending of the earlier message, and the confirmation or refutation is performed based on (1) the determination of the node being in the predefined state when the earlier message was sent and (2) the comparison of (a) the value of the received or recorded message to (b) the expected value.

18. The device as recited in claim 15, wherein the message is received or recorded by the node while the node is in the predefined state, the predefined detection rule defines the expected value of the received or recorded message whenever received or recorded while the node is in the predefined state, and the confirmation or refutation is performed based on (1) the determination of the node being in the predefined state when the message is received or recorded and (2) the comparison of (a) the value of the received or recorded message to (b) the expected value.

19. The device as recited in claim 15, wherein the device is configured to perform the confirmation of the occurrence of the anomaly, the predefined detection rule defines that the node does not receive or record the message whenever the node is in the predefined node state, and the occurrence is confirmed in response to determining that, in contravention to the predefined rule, the message has been received or recorded while the node was in the predefined node state.

20. The device as recited in claim 15, wherein the computer network includes a switching device and terminals, and the node is one of the terminals.

\* \* \* \* \*